United States Patent Office 3,277,721
Patented Oct. 11, 1966

3,277,721
METHOD AND APPARATUS FOR MEASURING HIGH PRESSURES OF A HOT FLUID MEDIUM
Horst Bader, Stuttgart-Sillenbuch Germany, assignor to I. C. Eckardt A.G., Stuttgart-Bad Cannstatt, Germany
Filed July 25, 1963, Ser. No. 297,551
Claims priority, application Switzerland, June 13, 1963, 7,351/63
20 Claims. (Cl. 73—408)

The present invention relates to a method and an apparatus for measuring high pressures of a hot fluid medium. Such measurements have to be carried out frequently especially in industrial chemistry, for example, in the production of synthetic fibers in which the liquid nylon or perlon mass or the like is forced through nozzles at a temperature of about 400° C. and a pressure of about 600 atmospheres.

For supervising such pressures, pressure meters are known in which the pressure medium to be supervised acts through an elastic wall, for example, a diaphragm or a plunger with elastic walls which projects into the medium, upon a transmitting fluid which then transmits the pressure of the medium to a Bourdon tube. Such pressure meters can, however, be employed at high temperatures only to limited extent since the temperature-responsive expansion of the transmitting fluid falsifies the pressure valves to be measured. Furthermore, in the event that the diaphragms or elastic walls of these pressure meters were ruptured, the transmitting fluid became mixed with the medium to be measured. This danger in itself is often the main reason for not employing pressure meters which operate by means of a transmitting fluid. A pressure meter in which a plunger is immersed into the pressure medium has the further disadvantage that, if it is employed, for example, for measuring the pressure of a plastic material, it will be locked therein when the material solidifies and cannot be removed therefrom without being destroyed. Although this particular disadvantage is avoided when employing a diaphragm, it is, however, necessary to make such a diaphragm relatively large in order to displace the quantity of fluid which is necessary for the operation of a Bourdon tube.

It is an object of the present invention to provide a pressure meter which is designed so as to exclude the temperature influences which falsify the results of the pressure measurements. The pressure meter according to the invention should also be designed so as to permit it to be easily connected to a pressure vessel, and it should not project into the pressure medium and especially it should be safe when subjected to excessive pressures.

For attaining these objects, the present invention provides a new measuring method, the principles of which are that the medium exerts its pressure upon a small flexible plate which is rigidly mounted near its outer edge and has a solidity so as to be bent by the pressure of the medium only for the distance of a few hundredths of a millimeter, that the movement of this plate in accordance with the pressure of the medium produces a pressure rise in a pressure chamber which forms a part of a measuring system which is known as such and consists of the mentioned pressure chamber, a preliminary throttle through which compressed air is passed under a constant pressure into this chamber, a nozzle at the other end of this chamber through which a jet of compressed air is blown upon a flapper surface on a member which is rigidly connected to the mentioned plate, and that the rise in pneumatic pressure in the pressure chamber which is due to the movement of the plate and the flapper surface thereon toward the nozzle is then measured by a pressure gauge.

In order to prevent the measured pressure values from being falsified by temperature influences, the method according to the invention provides that the influence of the temperature of the pressure medium upon the bending of the flexible plate be compensated by an opposite temperature-responsive change of the throttle characteristic of the nozzle-flapper surface system which is attained by heating the air which is discharged from the nozzle and by a temperature-responsive increase of the distance between the nozzle and the flapper surface which is attained by a difference in the temperature expansion of the nozzle mounting means and the part carrying the flapper surface. According to the invention, the heat required for heating up the compressed air emerging from the nozzle and for expanding the nozzle mounting means and the part carrying the flapper surface may be supplied by the medium the pressure of which is to be measured.

For carrying out this new method, the invention provides a device of the type as already described above. The particular feature of this device is that the flexible plate which is acted upon by the pressure medium to be measured is rigidly secured to the end surface of a steel casing in which the nozzle is mounted in a manner so that the jet of compressed air issued therefrom is directed toward the center of the flexible plate, and that this steel casing is provided with means for securing it to the pressure vessel. Since for measuring a distance by means of a pneumatic nozzle, the flexible plate only has to be bent for a few hundredths of a millometer to cover the measuring range, the flexible plate may be made very small and the wall of the pressure vessel therefore has to be provided only with a small opening into which the end of the pressure meter is inserted.

The flexible plate may according to the invention be provided at its center with a tappet which projects into the inside of the casing and has an end surface which lies opposite to the nozzle mouth and serves as the flapper surface. Thus, a direct action by the jet of compressed air from the nozzle upon the flexible plate which might result in thermal stresses within the flexible plate will be avoided.

Further features of the invention consists in providing the flexible plate in the shape of a small coin the thickness of which at first decreases from the edge toward the center and then increases considerably at the center. In order to facilitate the production of the flexible plate, it is advisable to cut a recess in the plate at the side facing the pressure medium so as to make it cup-shaped and to provide it at the opposite side at its unstressed central portion with a threaded nipple upon which the tappet is then screwed. The flexible plate may then be welded into the end of the housing. This design of the flexible plate has the advantage that its cross-sectional area changes in the radial direction in accordance with the bending movements which act upon the plate. This means that within the areas of the flexible plate in which high bending stresses occur, the plate has a greater cross-sectional thickness. Despite its small diameter, the flexible plate is thus made of a great solidity and also a high flexibility. This, in turn, means that the total dimensions of the pressure meter may be made very small in order to attain the movements which are required for the proper functions of the nozzle. Thus, at a pressure of the medium of 630 kg./cm.$^2$, a flexible plate of a diameter of only 10 mm. will bend as much as approximately 1/10 mm. and will still have an excess-pressure safety factor of 50%.

According to further features of the invention, the nozzle tube may be mounted in the casing so as to be adjustable in its axial direction and the casing may be provided with an end plate on which the setting means for adjusting the nozzle tube are secured. Furthermore, a cylindrical centering member which surrounds the nozzle tube may be screwed into the casing, and in the centering member a clamping member may be provided which may be shifted in the radial direction of the centering member by means of an eccentric part of a rotatable spindle so that the nozzle tube may be clamped in a fixed position within the centering member by forces which extend solely in the radial direction. Such a clamping device has the advantage that the parts which are clamped together will not shift relative to each other when being heated or when cooling. The mentioned end plate which carries the setting means for the nozzle tube may also be secured in the tublar casing by means of a spring ring which is clamped solely in the axial direction against the inner wall of the casing by at least one eccentric pin or setscrew which is mounted in the end plate.

The part of the air supply line between the nozzle tube and the end plate may consist of an elastic capillary tube of metal which is helically coiled.

The invention further provides that the tappet is made of a material the coefficient of thermal expansion of which is smaller than that of the steel casing and that of the centering member which surrounds the nozzle tube.

Another feature of the invention consists in reducing the cross-sectional area of the nipple or the tappet at least at one point near the flexible plate so as to diminish the flow of heat from the flexible plate to the flapper surface of the tappet. Finally, the invention provides a heat-conductive connection between the clamping means for the nozzle tube and the pressure medium, and it provides further that the distance between the clamping point on the nozzle tube within the centering member and the pressure vessel is considerably greater than the length of the tappet.

The features and advantages of the method according to the invention and of a preferred embodiment for carrying out this method will become more clearly apparent from the following detailed description which is to be read with reference to the accompanying drawings, in which FIGURE 1 shows a cross section of an apparatus which illustrates the principles of the invention;

FIGURE 6 shows a detail view of the parts for clamping the nozzle tube; while

Figure 1:
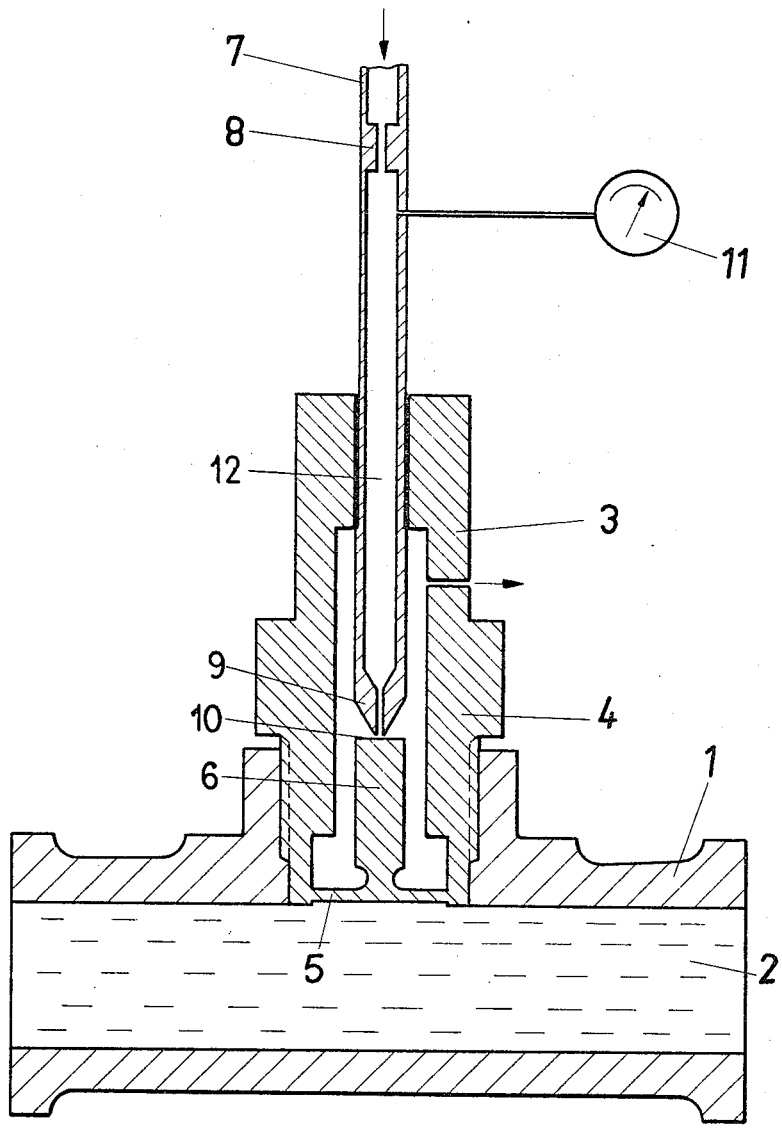

Referring to the drawings, FIGURE 1 illustrates the principles of the invention on a pressure vessel in the form of a pipe 1 which contains the fluid pressure medium to be measured which has a temperature of, for example, 400° C. and a pressure of, for example, 200 to 600 atmospheres. The wall of pipe 1 is provided with an aperture into which the pressure meter 3 according to the invention is inserted which consists essentially of a tubular casing 4, a small flexible plate 5 with a tappet 6 thereon and a compressed-air line 7. This compressed-air line 7 is provided with a preliminary throttle passage 8, and at its end with an outlet nozzle 9 which is located at a small distance from the end surface 10 of the tappet 6 which serves as a flapper surface. Between the preliminary throttle passage 8 and the outlet nozzle 9, a pressure gauge 11 is connected to the compressed-air line 7 for indicating the pressure head which is building up within the chamber 12 between the nozzle 9 and the throttle 8.

The flexible plate 5 will be bent upwardly in accordance with the pressure of the pressure medium 2 so that as this pressure increases, the distance between the end surface 10 of the tappet 6 decreases and the throttle effect of the nozzle-and-flapper-surface system 9, 10 increases. A pressure head is then built up in chamber 12 the strength of which is in a definite proportion to the pressure of the medium 2 in pipe 1 and may be read on the pressure gauge 11. The distance between nozzle 9 and the flapper surface 10 is likewise functionally dependent upon the pressure head in chamber 12. This dependency is called the throttle characteristic of the nozzle-and-flapper-surface system.

If the pressure medium 2 has a high temperature, this pressure measuring method can however, be employed only if the various influences which are produced by such temperatures which falsify the measured indications of the pressure values can be eliminated. The temperature of the pressure medium 2 primarly affects the coefficient of elasticity of the flexible plate 5 since the extent at which this plate will be bent depends not only upon the pressure of the medium 2, but also upon the temperature to which the plate is heated. The temperature of the medium 2 also affects the size and shape of the nozzle 9 and its orifice, as well as the flapper surface 10 and especially the gravity of the outstreaming compressed air, and it thereby also varies the throttle and meauring characteristics. Finally, changes in the temperature of the pressure medium will also result in different degrees of expansion of the tappet 6 and the supporting parts of nozzle 9, especially the casing 4, and thus in changes in the distance between the nozzle 9 and the flapper surface 10.

Figure 2:
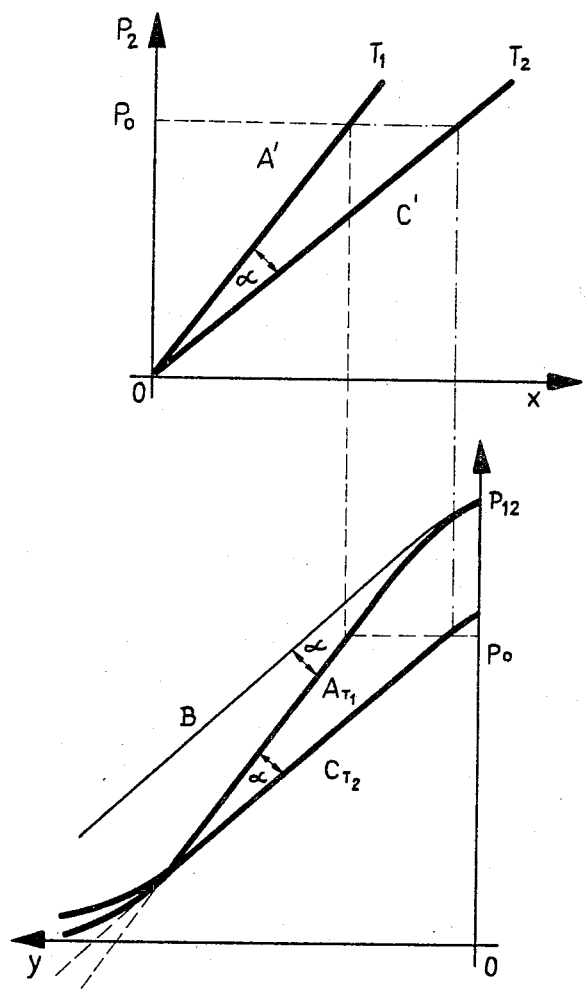
FIGURE 2 shows two diagrams for illustrating the thermal effects.

According to the present invention, these three temperature influences are to be compensated against each other, as subsequently described with reference to FIGURE 2. The upper diagram of FIGURE 2 indicates the pressure $P_2$ of the medium 2 which is plotted as against the bending of the flexible plate 5, and the temperature dependence of the bending of the flexible plate. The line A' indicates the pressure-to-distance characteristic for a temperature $T_1$ of, for example, 20° C., while the line C' indicates the pressure-to-distance characteristics for a temperature $T_2$ of, for example, 400° C., which is less inclined by the angle $\alpha$. In the lower diagram of FIGURE 2, the pressure $p_{12}$ is plotted which prevails in chamber 12 as against the distance y between the nozzle 9 and the flapper surface 10, and it also shows the throttle characteristic $A_{T1}$ of the nozzle-flapper surface system for the temperature $T_1$. The central part of the throttle characteristic $A_{T1}$ which serves as the measuring range is almost rectilinear. The point of intersection between the throttle characteristic $A_{T1}$ and the ordinate indicates the pressure head which prevails in chamber 12 when the nozzle 9 is closed and which is equal to the pressure which prevails in the air supply line 7. If, therefore, as indicated in FIGURE 2 in dotted lines, the medium 2 has a pressure $P_0$ and a temperature $T_1$, this pressure will be translated into a pressure $p_0$ in chamber 12.

In order to eliminate from the measurement the influence of the temperature upon the coefficient of elasticity, that is, the bending of the flexible plate 5 insofar as it is affected by the temperature of the medium, the inclination of the throttle characteristic $A_{T1}$ must be reduced in accordance with the temperature by the same angle $\alpha$ as the characteristic C' differs from the characteristic A'. According to the invention, this is attained by a compensation of the first-mentioned temperature effect, i.e., the bending of the flexible plate 5, by the two other temperature effects, namely, the heating of the nozzle-and-flapper-surface system and the differences in the expansion due to temperature changes.

By heating up the nozzle-and-flapper-surface system, it is possible to transpose the throttle characteristic $A_{T1}$ so as to coincide with the characteristic B. This heating may be effected by special heating means, although it is more advantageous to utilize for this purpose the heat of the medium 2 itself. In this case, the flow of heat from the medium 2 to the nozzle-and-flapper-surface system is determined by making the casing 4 and the tappet 6 of such dimensions and materials that the heating of the nozzle-and-flapper-surface system will result at a temperature $T_2$ of the medium in a swiveling of the throttle characteristic $A_{T1}$ about the mentioned angle $\alpha$ to the characteristic B.

By making the tappet 6 and the parts which carry the nozzle 9, especially the casing 4, of a suitable shape and material, it is also possible by a different expansion of the different parts to increase the distance $y$ between the nozzle 9 and the flapper surface 10. In the illustration according to FIGURE 2, this means a parallel displacement of the characteristic B into the throttle characteristic $C_{T2}$ which is then inclined in the same direction about the mentioned angle $\alpha$ relative to the throttle characteristic $A_{T1}$. As indicated in FIGURE 2 in dot-and-dash lines, the pressure $P_0$ of the medium 2 is then also translated even at the higher temperature $T_2$ as at the lower temperature $T_1$. Due to the reciprocal compensation of the three temperature effects as above described, the measured pressure values which are attained by the measuring method according to the invention are therefore independent of the temperature of the medium to be measured.

Figure 3:
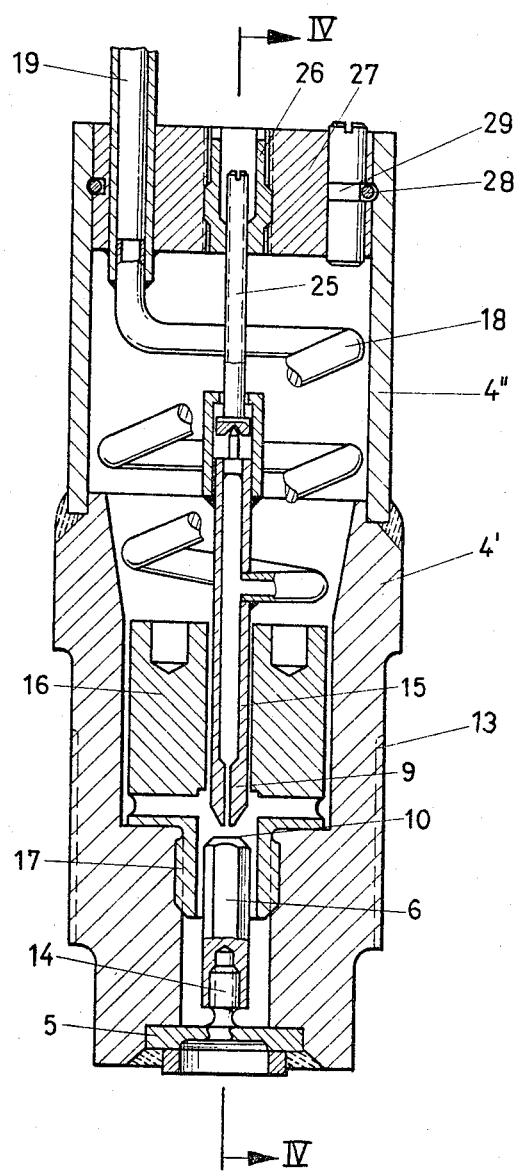
FIGURE 3 shows a cross section of a pressure meter according to the invention which section is taken along lines III—III of FIGURES 4 and 5.
Figure 4:
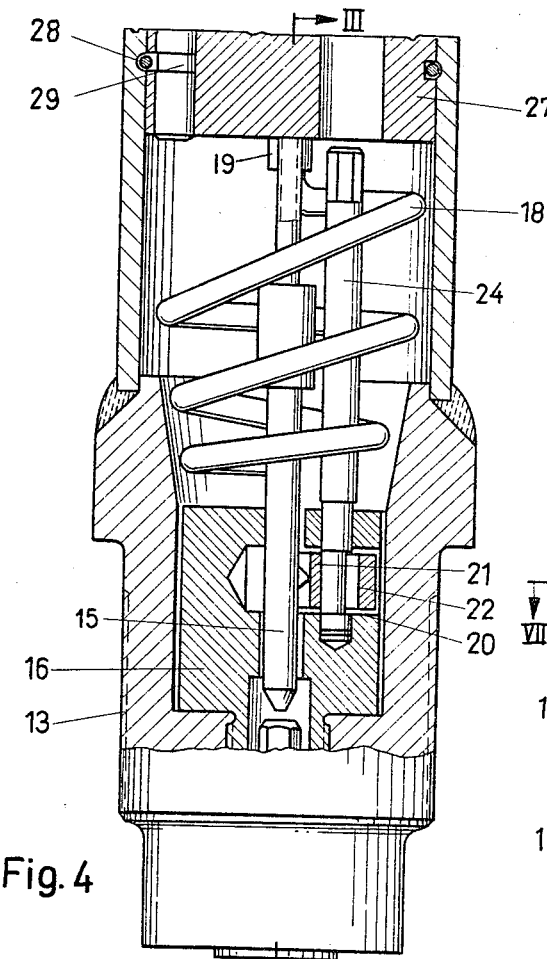
FIGURE 4 shows a cross section of the same pressure meter which section is taken along lines IV—IV of FIGURES 3 and 5.
Figure 5:
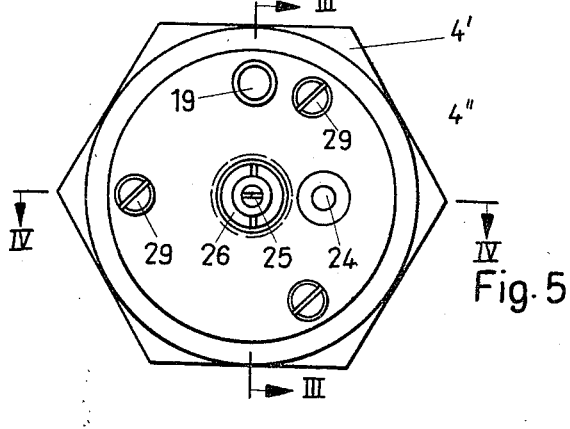
FIGURE 5 shows a top plan view of the pressure meter according to FIGURES 3 and 4.

FIGURES 3 to 5 illustrate on an enlarged scale a preferred embodiment of the pressure meter according to the invention. The casing 4 consists of the two steel cases 4' and 4'' which are welded together, and it is closed at its lower end by a flexible plate 5 which is welded into the lower case 4'. Casing 4 has an outer screw thread 13 to permit it to be screwed into a corresponding bore in the wall of a pressure tank or other pressure vessel. Of course, in place of a screw connection, it is also possible to connect the casing 4 to the pressure pipe or tank by flanges or, if this is advisible for sealing reason, the lower case 4' may also be welded into the wall of the pressure pipe or tank. The flexible plate 5 may, if required, also be mounted so as to be flush with the edge of the case 4'.

The flexible plate 5 is designed so as first to decrease in thickness from its outer edge, and at the center of its rear side it is reinforced by the nipple 14. Upon this nipple 14 a stem 6 is screwed the end surface 10 of which forms the flapper surface and therefore lies opposite to the mouth of the nozzle 9. The nozzle tube 15 is inserted into a central bore in the centering member 16 which is secured by a screw thread 17 to the case 4'. Nozzle 9 is connected to the compressed-air supply by a coiled elastic capillary tube 18 and a pipe 19.

Figure 6:
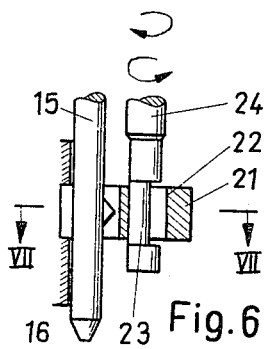
Figure 7:
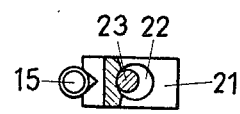
FIGURE 7 shows a cross section which is taken along lines VII—VII of FIGURE 6.

As illustrated particularly in FIGURES 4, 6 and 7, the centering member 16 is provided with a radial bore into which a clamping member 21 is inserted. This clamping member has a bore 22 in which the eccentric part 23 of a spindle 24 is inserted which may be turned by means of a wrench. On its side which engages with a nozzle tube 15, the clamping member is provided with a circular cutout and it engages at four points on the nozzle tube 15. This particular construction of the clamping device for the nozzle tube permits this tube to be held in the centering member 16 only by forces which extend vertically to its axis. This prevents the clamped parts to shift relative to each other when heated which would result in a displacement of the zero position of the pressure meter.

When the nozzle tube 15 is not clamped, it may be coarsely adjusted by means of the threaded spindle 25 and finely adjusted by a setscrew 26. This setscrew 26 is mounted in a central tapped bore in the end plate 27 which by means of a clamping ring 28 and an eccentric screw 29 is likewise held in a groove in the wall of case 4'' solely by forces which extend vertically to its axis.

The air around the nozzle 9 is heated primarily by the heat which is transmitted through the tappet 6 to the flapper surface 10 and through the case 4' and the centering member 16. In order to increase the distance $y$ between the nozzle 9 and the flapper surface 10 in response to the temperature, the tappet 6 is made of a material of a low thermal expansion and the cross-sectional area of the heat passage through the small nipple 14 which moreover is recessed behind the flexible plate 5 is made as small as possible. Since the distance between the clamping point of the nozzle tube 15 in the centering member 16 and the hot medium 2 is greater than the length of the tappet 6, the temperature expansion affects the position of the nozzle tube 15 to a greater extent than the position of the flapper surface on the tappet 6.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A method of measuring high pressures of a fluid pressure medium having a high temperature comprising the steps of exerting the pressure of said medium upon a flexible rigidly mounted plate capable of bending under said pressure for a distance of a few hundredths of a millimeter, in which the temperature dependence of the bending of said flexible plate is compensated by a temperature-responsive change of the throttle characteristic of said measuring system, said change being caused by the air issuing from said nozzle being heated, and by a temperature-responsive increase of the distance between the nozzle and flapper surface caused by the different thermal expansion of the nozzle mounting means and the member carrying said flapper surface; thereby producing a pressure rise in a pressure chamber of a measuring system comprising a preliminary throttle through which compressed air is passed under a constant pressure into said chamber, a nozzle connected to said chamber for blowing a jet of air upon a flapper surface on a member rigidly connected to said flexible plate; and then measuring the rise in pneumatic pressure in said chamber due to the movement of said plate and the flapper surface thereon toward said nozzle.

2. A method as defined in claim 1, in which the heat required for heating the air issued from the nozzle and for expanding the nozzle mounting means and the member carrying the flapper surface is supplied by the fluid medium to be measured.

3. An apparatus for measuring high pressures of a fluid pressure medium having a high temperature, comprising a steel casing, means for connecting one end of said casing to a vessel containing said medium, a pressure chamber, a throttle connected to said chamber, means for passing compressed air of a constant pressure through said throttle into said chamber, a nozzle connected to said chamber, and mounted on and extending into said casing, a flexible plate rigidly secured at its outer periphery to said casing near said end thereof and sealing said casing toward said end, the inner side of said plate within said casing being disposed opposite to the mouth of said nozzle and coaxially thereto and forming a flapper surface, so that when a jet of air passes from said chamber through said nozzle, it impinges centrally upon said flapper surface, and a pressure gauge connected to said chamber for measuring the rise in pressure in said chamber due to the movement of said plate, and the flapper surface thereon toward said nozzle, on its side facing the pressure medium said flexible plate has a central cup-shaped recess and on its opposite side and centrally thereof a threaded nipple, and a tappet screwed upon said nipple and having an end surface disposed opposite to said nozzle and forming said flapper surface.

4. An apparatus for measuring high pressures of a fluid pressure medium having a high temperature, comprising a steel casing, means for connecting one end of said casing to a vessel containing said medium, a pressure chamber, a throttle connected to said chamber, means for passing compressed air of a constant pressure through said throttle into said chamber, a nozzle connected to said chamber, and mounted on and extending into said casing, a flexible plate rigidly secured at its outer periphery to said casing near said end thereof and sealing said casing toward said end, the inner side of said plate within said casing being disposed opposite to the mouth of said nozzle and coaxially thereto and forming a flapper surface, so that when a jet of air passes from said chamber through said nozzle, it impinges centrally upon said flapper surface, and a pressure gauge connected to said chamber for measuring the rise in pressure in said chamber due to the movement of said plate and the flapper surface thereon toward said nozzle, a tappet secured to the center of said flexible plate and extending toward the inside of said casing, the end surface of said tappet being disposed opposite to said nozzle and forming said flapper surface, a nozzle tube containing said pressure chamber and having said nozzle on one end thereof, and means for adjusting said nozzle tube in its axial direction in said casing, a cylindrical centering member screwed into said casing and surrounding said nozzle tube, means for clamping said nozzle tube in said centering member comprising a clamping member within said centering member, and a rod-shaped member rotatably mounted in said casing having an eccentric part thereon adapted to act upon said clamping member so clamp said nozzle tube so that said nozzle tube may be clamped tightly in said centering member solely by radially directed forces.

5. An apparatus as defined in claim 4, in which said tappet consists of a material having a temperature coefficient smaller than that of said steel casing and said centering member.

6. An apparatus as defined in claim 4, in which said means for clamping said nozzle tube are in heat-conductive communication with said pressure medium, the distance between the point at which said nozzle tube is clamped by said clamping member in said centering member being considerably greater than the length of said tappet.

7. An apparatus for measuring high pressures of a fluid pressure medium having a high temperature, comprising a steel casing, means for connecting one end of said casing to a vessel containing said medium, a pressure chamber, a throttle connected to said chamber, means for passing compressed air of a constant pressure through said throttle into said chamber, a nozzle connected to said chamber, and mounted on and extending into said casing, a flexible plate rigidly secured at its outer periphery to said casing near said end thereof and sealing said casing toward said end, the inner side of said plate within said casing being disposed opposite to the mouth of said nozzle and coaxially thereto and forming a flapper surface, so that when a jet of air passes from said chamber through said nozzle, it impinges centrally upon said flapper surface, and a pressure gauge connected to said chamber for measuring the rise in pressure in said chamber due to the movement of said plate and the flapper surface thereon toward said nozzle, a tappet secured to the center of said flexible plate and extending toward the inside of said casing, the end surface of said tappet being disposed opposite to said nozzle and forming said flapper surface, a nozzle tube containing said pressure chamber and having said nozzle on one end thereof, and means for adjusting said nozzle tube in its axial direction in said casing, the end of said casing opposite to the end containing said flexible plate is closed by an end plate, said means for adjusting said nozzle tube being mounted on said end plate, a spring ring for securing said end plate in said casing, and at least one eccentric member rotatably mounted in said end plate and movable in a radial direction for pressing said spring ring against the inner wall surface of said casing.

8. An apparatus for measuring high pressures of a fluid pressure medium having a high temperature, comprising a steel casing, means for connecting one end of said casing to a vessel containing said medium, a pressure chamber, a throttle connected to said chamber, means for passing compressed air of a constant pressure through said throttle into said chamber, a nozzle connected to said chamber, and mounted on and extending into said casing, a flexible plate rigidly secured at its outer periphery to said casing near said end thereof and sealing said casing toward said end, the inner side of said plate within said casing being disposed opposite to the mouth of said nozzle and coaxially thereto and forming a flapper surface, so that when a jet of air passes from said chamber through said nozzle, it impinges centrally upon said flapper surface, and a pressure gauge connected to said chamber for measuring the rise in pressure in said chamber due to the movement of said plate and the flapper surface thereon toward said nozzle, a tappet secured to the center of said flexible plate and extending toward the inside of said casing, the end surface of said tappet being disposed opposite to said nozzle and forming said flapper surface, a nozzle tube containing said pressure chamber and having said nozzle on one end thereof, and means for adjusting said nozzle tube in its axial direction in said casing, the end of said casing opposite to the end containing said flexible plate is closed by an end plate, said means for adjusting said nozzle tube being mounted on said end plate, a helically coiled capillary tube between said end plate and said nozzle tube for conducting compressed air to said nozzle tube.

9. An apparatus for measuring high pressures of a fluid pressure medium having a high temperature, comprising a steel casing, means for connecting one end of said casing to a vessel containing said medium, a pressure chamber, a throttle connected to said chamber, means for passing compressed air of a constant pressure through said throttle into said chamber, a nozzle connected to said chamber, and mounted on and extending into said casing, a flexible plate rigidly secured at its outer periphery to said casing near said end thereof and sealing said casing toward said end, the inner side of said plate within said casing being disposed opposite to the mouth of said nozzle and coaxially thereto and forming a flapper surface, so that when a jet of air passes from said chamber through said nozzle, it impinges centrally upon said flapper surface, and a pressure gauge connected to said chamber for measuring the rise in pressure in said chamber due to the movement of said plate and the flapper surface thereon toward said nozzle, a tappet secured to the center of said flexible plate and extending toward the inside of said casing, the end surface of said tappet being disposed opposite to said nozzle and forming said flapper surface, said tappet has at least one constriction near said flexible plate for reducing the heat flow from said flexible plate to the flapper surface on said tappet.

10. An apparatus for measuring high pressures of a fluid pressure medium having a high temperature, comprising: a casing, means for connecting one end of said casing to a vessel containing said medium, a pressure chamber, a throttle connected to said chamber, means for passing a high pressure measuring fluid of a constant pressure through said throttle into said chamber, a nozzle connected to said chamber and mounted to extend into said casing, flexible relatively rigid plate means rigidly secured at its outer periphery to said casing near said one end thereof and sealing said casing toward said one end, the inner side of said plate means within said casing being disposed opposite and adjacent to the mouth of said nozzle, and coaxially thereto and forming a flapper surface, so that when a jet of measuring fluid passes from said chamber through said nozzle, it impinges centrally upon said flapper surface, said plate means having a rigidity to withstand pressures up to about 600 atmospheres and flexing to progressively and continuously change the gap between said flapper surface and said nozzle mouth in proportion to increased pressure of the fluid medium up to 600 atmospheres, and pressure responsive means connected to said chamber for measuring the rise of pressure in said chamber due to the change in the gap produced by the flexing of said plate means.

11. The device of claim 10, including conduit means to deliver said measuring fluid to said throttle, said conduit means being operable to heat said measuring fluid to decrease the temperature difference between said measuring fluid and said medium.

12. The device of claim 10, including means operable to coarsely adjust the gap between said nozzle mouth and said flapper surface, and separate means to finally adjust the gap between said nozzle mouth and said flapper surface.

13. The device of claim 10, wherein said plate means has a relatively large thickness at its outer edges and central portions where the flexing tensile and compression stresses are the greatest and opposite, and a relatively small thickness in the intermediate area where the flexing tensile and compression stresses are zero or relatively very weak, to increase the flexibility of said plate means without sacrificing its ability to withstand high pressure and temperature.

14. The device of claim 10, including a tappet means having one end centrally mounted on the inner side of said plate means and having its opposite end forming said flapper surface, the length from end to end of said tappet means being several times the thickness of said plate means, said tappet means being operable to thermally insulate said plate means from the relatively cold jet of fluid to prevent destructive thermal stresses caused by the difference in temperature of the jet on one side and the fluid pressure medium on the other side at a temperature up to about 400° C.

15. The device of claim 14, wherein said tappet means has a portion of reduced diameter closely adjacent said one end to inhibit heat transfer from said one end to said opposite end.

16. The device of claim 14, wherein said tappet means consists of a material having a temperature coefficient smaller than that of said casing.

17. An apparatus for measuring high pressures of a fluid pressure medium having a high temperature comprising, a casing, means for mounting one end of said casing to a vessel containing said medium, a pressure chamber, a throttle connected to said chamber, means for passing a high pressure measuring fluid of a constant pressure through said throttle into said chamber, a nozzle connected to said chamber, and mounted on and extending into said casing, flexible plate means rigidly secured at its outer periphery to said casing near said one end thereof, and sealing said casing toward said end, the inner side of said plate means within said casing being disposed opposite and adjacent to the mouth of said nozzle and coaxially thereto and forming a flapper surface, so that when a jet of measuring fluid passes from said chamber through said nozzle it impinges centrally upon said flapper surface, pressure responsive means connected to said chamber for measuring the rise in pressure in said chamber due to the change in the gap between said nozzle mouth and said flapper surface produced by the flexing of said plate means in response to the pressure of said fluid pressure medium, tappet means having one end centrally mounted on the inner side of said plate means and having its opposite end forming said flapper surface, the length from end to end of said tappet means being several times the thickness of said plate means, said tappet means being operable to thermally insulate said plate means from the relatively cold jet of fluid to prevent destructive thermal stresses caused by the difference in temperature of the jet on one side and the fluid pressure medium on the other side at a temperature up to about 400° C.

18. The device of claim 17, wherein said tappet means has a portion of reduced diameter closely adjacent said one end to inhibit heat transfer from said one end to said opposite end.

19. The device of claim 17, wherein said plate means has a relatively large thickness at its outer edges and central portion where the flexing tensile and compression stresses are the greatest and opposite, and a relatively small thickness in the intermediate area where the flexing tensile and compression stresses are zero or relatively very weak, to increase the flexibility of said plate means without sacrificing its ability to withstand high pressures and temperatures.

20. The device of claim 17, wherein said tappet means has a temperature coefficient smaller than that of said casing.

References Cited by the Examiner
UNITED STATES PATENTS

| | | | |
|---|---|---|---|
| 3,084,548 | 4/1963 | Copland et al. | 73—388 |
| 3,124,959 | 3/1964 | Pall et al. | 73—407 |
| 3,138,168 | 6/1964 | Waller | 137—82 |
| 3,150,674 | 9/1964 | Connaught | 137—82 |

LOUIS R. PRINCE, *Primary Examiner.*

D. O. WOODIEL, *Assistant Examiner.*